May 26, 1964

J. L. HALSMER 3,134,560

TANDEM ENGINE AND ROADABLE AIRCRAFT

Filed March 9, 1961

INVENTOR.
JOSEPH L. HALSMER
BY
Trask, Jenkins & Hanley
ATTORNEYS.

May 26, 1964  J. L. HALSMER  3,134,560
TANDEM ENGINE AND ROADABLE AIRCRAFT
Filed March 9, 1961  3 Sheets-Sheet 2

INVENTOR.
JOSEPH L. HALSMER
BY
Trask, Jenkins & Hanley
ATTORNEYS.

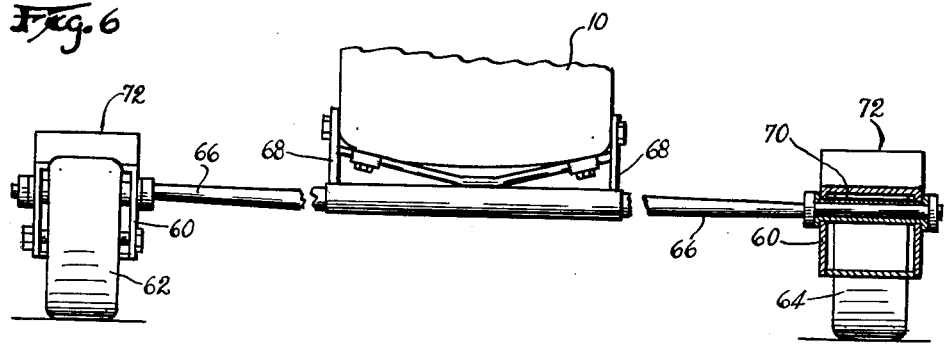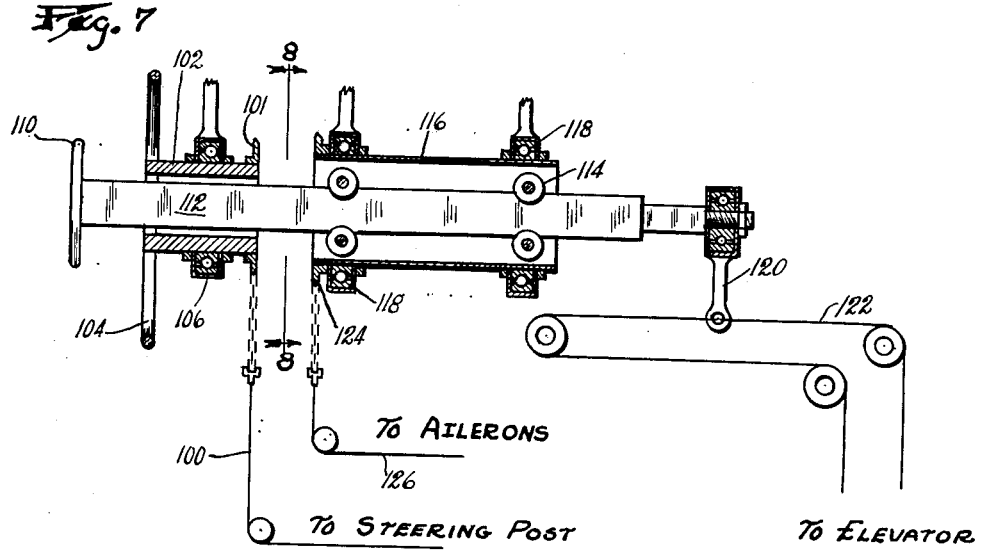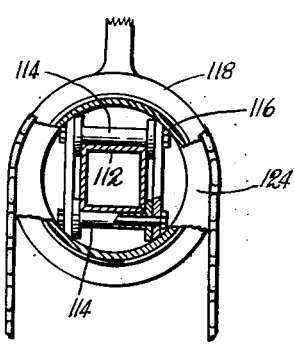

United States Patent Office 3,134,560
Patented May 26, 1964

3,134,560
TANDEM ENGINE AND ROADABLE AIRCRAFT
Joseph L. Halsmer, Rte. 5, Lafayette, Ind.
Filed Mar. 9, 1961, Ser. No. 94,554
13 Claims. (Cl. 244—2)

This invention relates to aircraft, and more especially to an aircraft which may be converted to a ground vehicle adapted to be driven on the roads.

It is an object of the invention to provide a compact and efficient fuselage arrangement with forward and rear propellers driven by engines in tandem, in front of and behind a cockpit or cabin. It is a further object of the invention to provide for folding the aircraft wings in a convenient and efficient manner and to position the folded sections in protecting relation with the rear propeller. It is a further object of the invention to provide improved running gear for the aircraft which is suitable both for aircraft operation, as in landing and take-off, and for road vehicle operation.

In accordance with the invention, the air and road vehicle comprises a fuselage forming a cockpit or cabin and having a forward engine driving a front propeller and a rear engine, behind the cabin, driving a rear propeller. The fuselage is fixed to a central wing section of a width longer than the diameter of the rear propeller, and outer wing sections are connected to the center wing sections and to struts from the fuselage. The tail stabilizer and fin assembly is carried by a pair of booms extending rearward from the ends of the central wing section. The outer wing connections are such that each outer wing section can be folded by first rotating the section about a longitudinal axis to a substantially vertical position, and then swinging the section rearward to a position alongside its adjacent boom. In this position the two wing sections extend as side walls past the rear propeller to protect it in use for ground propulsion. The wing strut structure is of Y configuration, with the rear arm telescopically collapsible to permit the wing rotation, and with the stem of the Y including an articulated joint permitting the rearward swinging of the wing section. In folded position, the outer wing section lies inside the strut joint, and between the strut arms on the outside and a stop on the inside.

The running gear in accordance with the invention comprises a pair of parallel bogies spaced outward from the fuselage and extending considerable distance both forward and rearward from the centers of gravity and of lift. Each bogie includes a fixed axis rear wheel and a steerable front wheel. The bogies are pivotally and resiliently mounted to the fuselage, on an axis rearward of the center of gravity, as by a transverse bar spring. Their front ends are interconnected by a front crossmember, which is preferably a bar spring. Such front cross member is mounted to the fuselage frame by a downwardly extensible support which is biased upward, so that in flight the bogies have a streamline position while on landing and take-off the bogies can pivot to horizontal ground-engaging position when the aircraft is tilted to present its wing in a proper angle of attack. The extensible front support includes a scissors mechanism connected to steering mechanism including steering links extending along the front cross member to the front steerable wheels. For ground operation the extensible support may be locked in raised position so that the fuselage is then rigidly connected to the spring members by which it is sprung on the pair of bogies.

The cockpit controls for the roadable aircraft desirably include wheel brakes and a steering wheel for ground operation, and an aileron and elevator control wheel, which is desirably coaxial with the steering wheel.

Other objects and novel features of the invention will be evident from the illustrative embodiment of my invention described below and shown in the accompanying drawings. In such drawings:

FIG. 6 is a rear elevation, with parts broken away showing the main running gear support.

FIG. 7 is a longitudinal section showing the coaxial control wheel assembly; and FIG. 8 is a section taken on the line 8—8 of FIG. 7.

Figure 1:
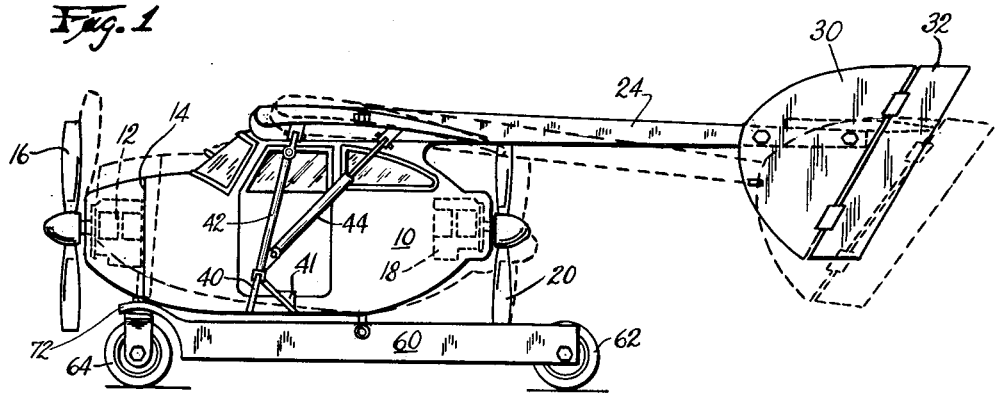
FIG. 1 is a side elevation of a roadable aircraft embodying my invention, with the parts in flight relation.

The aircraft shown in the drawings comprises a fuselage or cabin 10 having front and rear firewalls, and defining a pilot and passenger compartment between them. A front engine 12 carried by the front firewall 14 drives a tractor propeller 16, and a rear engine 18 drives a rear pusher propeller 20. The engines are directly in front of and behind the pilot compartment so that all are within the same frontal area.

A central wing section 22 is fixed above the cabin 10 and extends laterally to each side of the cabin. Booms 24 are fixed to this wing structure and extend rearward from the ends of the central wing section. At the rear, such booms are joined by a stabilizer 26 which carries an elevator 28. Vertical fins 30 are mounted on the booms at the ends of the stabilizer and support rudders 32.

Figure 2:
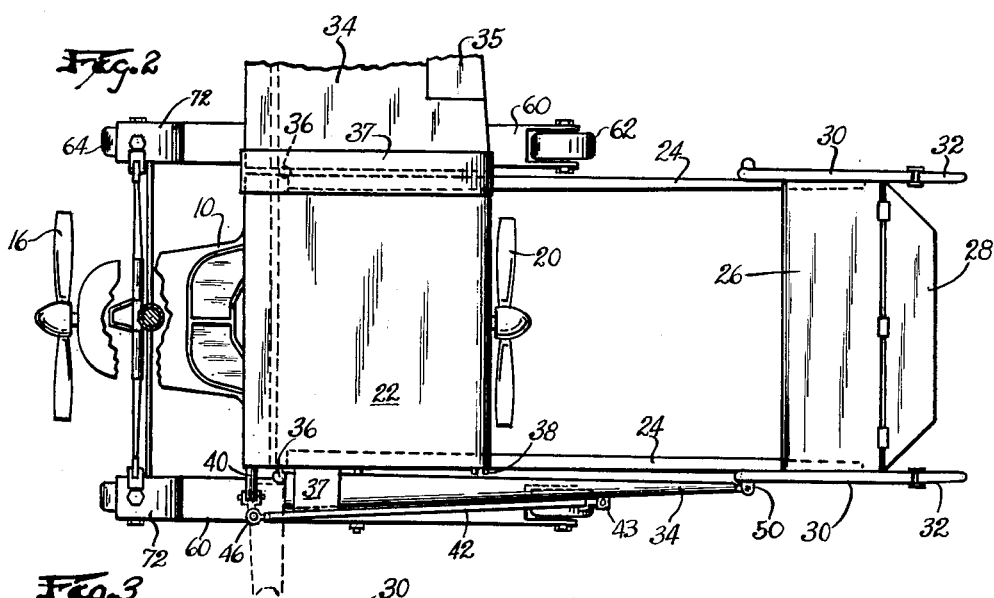
FIG. 2 is a plan view of the aircraft shown in FIG. 1, with one outer wing section in folded position.
Figure 3:
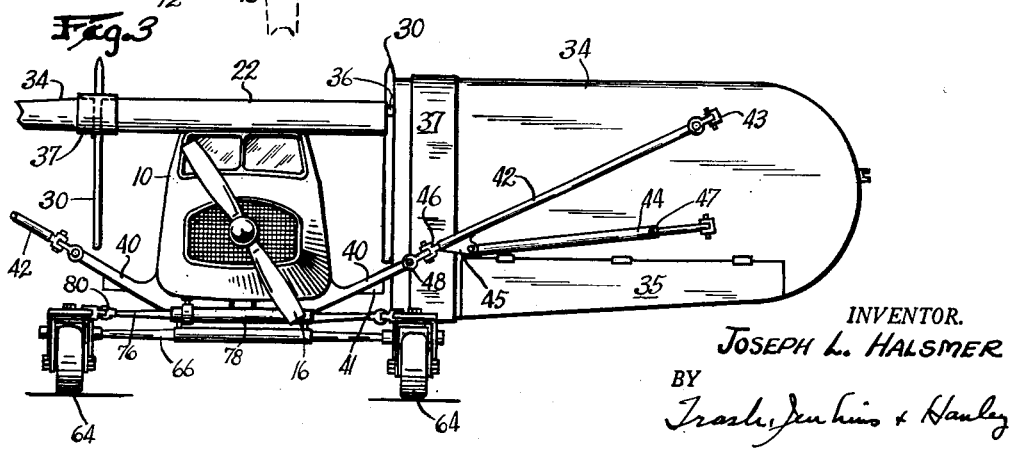
FIG. 3 is a front elevation of the aircraft, showing one wing in downward rotated position, from which it may be swung rearward to fully folded position, or rotated upward to flight position.

An outer wing section 34, including an aileron 35, is connected to each end of the center wing 22 and is supported by a Y-shaped strut structure. The connection to the center wing is by a main joint 36 at the end of the main or forward spar of the center section and adjacent the top surface of the wing, and by a releasable joint 38 adjacent the rear of the wing. When the releasable joint 38 is released, the main joint 36 permits the wing to be rotated on the axis of the joint from flight position to a vertical position as shown in FIG. 3, and then to be swung rearward to the folded position shown in FIG. 2. In flight position, the small gap between the center and outer wing sections may be covered by a strap boot 37.

The wing supporting strut comprises a fixed brace 40 mounted on the cabin structure and projecting outward and upward to a point outside the outer face of the folded wing. This carries a stop 41 for the folded wing, and supports the main strut arm 42 which extends to an outwardly spaced forward point on the wing section 32. A second strut arm 44 is connected from the base of the main strut to a second and rearward point on the wing section 32. The several strut connections are suitably articulated and swivelled to permit the wing folding movement. To this end, the main strut 42 may be mounted by means of a clevis 46 rotatably threaded in its end and mounted by means of a crossed-axis universal joint 48 on the end of the brace 40. The outer end of the main strut is connected to its wing anchor 43 by a similar crossed-axis universal joint. The second strut 44 is connected at its base to a bracket 45 on the main strut by a swivel eye threaded into its end, and is pivoted to its wing anchor. Such second strut 44 is telescopically collapsible, and is normally held extended by an anchor pin passed through holes 47 in its two members.

To fold an outer wing section, the releasable joint 38 is released and the anchor pin in the telescopically collapsible strut 44 is withdrawn and the wing is then rotated downward about an axis extending from the main joint 36 to the wing anchor 43. During such rotation, the strut 44 is shortened, and the strut 42 swivels on its clevis 46. In lowered position, the wing is still supported by the main joint 36 and by the universal joint at the base of the main strut 42. It is then swung rearward about those two joints, which disposes it in upright position between the boom 24 and the stop 41 on the inside and the struts 42 and 44 on the outside. The wing is locked in folded position by a latch connection 50 between the end of the wing and the fin 30.

The folded wings extend forward and rearward alongside the rear propeller 20 and provide protective walls to permit that rear propeller to be used for propulsion on the ground.

The running gear comprises two bogies 60 of box section, each having a fixed-axis rear wheel 62 and a steerable front wheel 64. The main mounting between each bogie and the fuselage is a transverse bar spring 66 secured to the fuselage by a bracket mounting 68 and pivotally received at its outer end in a pivot bearing 70 fixed in the bogie adjacent its longitudinal center. At the front, each bogie is formed to provide a forwardly extending top wall 72 which is supported by a swivel bearing on the straddle fork 74 in which the front wheel 64 is mounted.

The front mounting for the bogies 60 comprises bar springs 76 mounted at their inner ends in a carrier 78 and connected at their outer ends to the bogies, preferably by yieldable rubber joints 80 to permit limited independent pivotal movement of the bogies on their pivots 70. The front spring carrier 78 is fixed to a plunger 84 telescopically mounted in central vertical sleeve 86 of an A frame 88 pivotally fixed at its ends to the firewall 14 or other structure of the cabin 10.

Figure 4:
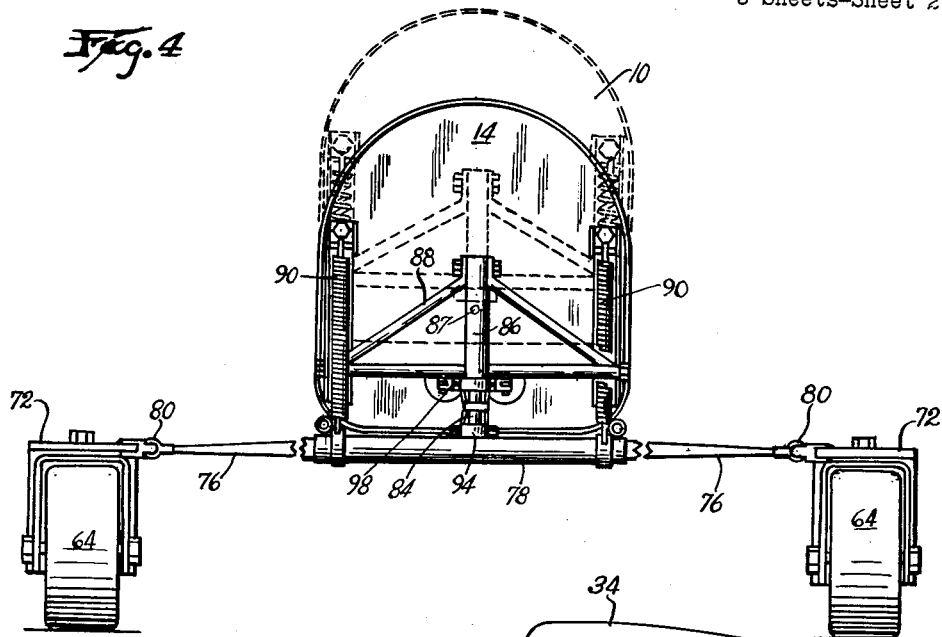
FIG. 4 is a transverse sectional view showing the front support for the running gear.

Tension springs 90 tend to pull the spring carrier 78 upward toward the cabin, and to hold the front end of the fuselage down on the spring carrier, in the relation shown in full lines in FIGS. 1 and 4. But the mounting permits the front end of the aircraft to rise, as indicated in dotted lines in FIG. 4, and allows the fuselage and wings to be tilted relative to the bogies, as indicated in dotted lines in FIGS. 1 and 5, to present the wings at a proper angle of attack for take-off and landing. For road operation, the plunger 84 may be locked in fixed position in the sleeve 86, as by an anchor pin inserted through holes 87 in the plunger and sleeve.

For steering, the steerable wheels are connected by links 92 to a steering arm 94 pivoted on the plunger 84 and connected by a scissors 96 to a steering lever 98 pivoted on the A-frame. Such steering lever is connected by cables 100 to a chain engaged over a sprocket 101 on the hub 102 of the steering wheel 104.

Figure 5:
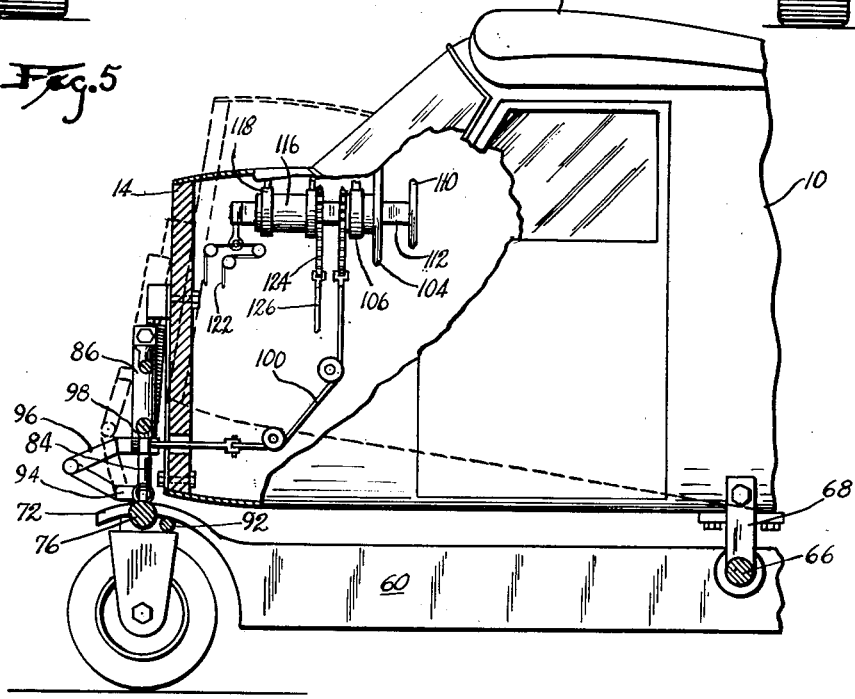
FIG. 5 is a side elevation of the fuselage, with parts broken away, showing the running gear support.

The ground steering and flight control mechanism is best shown in FIGS. 5, 7, and 8. The steering wheel 104 is carried by a hollow hub 102, which is suitably mounted for rotation, as by a ball bearing 106 carried by the fixed structure of the cabin.

The flight control wheel 110 is mounted on and controls a square shaft 112 which extends freely through the steering wheel hub 102. Such shaft 112 is mounted for axial movement on rollers 114 in a rotatable drum 116 carried by ball bearing sets 118 from fixed fuselage structure. The rear end of the shaft 112 rotatably carries a dependent arm 120 secured to a two-way cable 122 connected to control the elevator 28, so that in and out movement of the flight wheel 110 controls the elevator. The drum 116 carries a sprocket 124 engaged in a chain joined to cable 126 connected to control the ailerons 35 on the outer wing sections 34, so that rotation of the flight wheel 110 controls the ailerons.

I claim as my invention:

1. An aircraft, comprising a fuselage forming a pilot cabin, a center high wing section fixed to and above said fuselage, an outer wing section connected to each side of said center section, the connections including a releasable joint adjacent the rear edge of the wing and a swivel joint adjacent the forward edge, strut means extending from a fixed support on said fuselage below said fixed wing section to a swivel joint at an outer forward anchor point on the outer wing section, said swivel joints supporting said outer wing section from the fuselage and defining a longitudinal wing-rotation axis about which the outer wing section is rotatable to a substantially vertical depending position while so supported, said strut means having an articulated joint adjacent the position of the wing section in said vertical position, said first-named swivel joint and said articulated joint defining a swing axis and supporting the wing section thereon in said vertical position for swinging movement to a rearwardly extending folded position alongside the fuselage.

2. An aircraft as defined in claim 1 with the addition of a pair of booms extending rearward in spaced relation from adjacent the ends of the fixed wing section and supporting rear stabilizing surfaces for said aircraft, and a releasable latch for securing the outer end of the folded wing to said boom structure.

3. An aircraft as defined in claim 1 with the addition of a pair of running gear bogies for supporting said aircraft, each including a rear fixed-axis wheel positioned a substantial distance behind the centers of lift and gravity of the aircraft and a steerable front wheel in front of the centers of lift and gravity of the aircraft, a main mounting between said aircraft and pivot points on said bogies intermediate their length and behind the center of gravity of the aircraft, and a forward mounting including extensible means which, in ground operation of the craft, is normally collapsed by the weight of the craft to position the fuselage and bogies in generally parallel relation but which, in landing and take-off operation of the craft, extends to permit the front of the craft to tilt substantially upward to change the angle of attack of the wings for such landing and take-off while all wheels of the bogies are in engagement with the ground, and yieldable means urging said extensible means to collapsed position during flight to hold said bogies generally parallel with the fuselage in streamline positions.

4. An aircraft, comprising a fuselage, a center wing section and two outer wing sections, each outer wing section being connected at its inner end to the aircraft by a main joint adjacent one edge of the wing and a releasable joint adjacent the opposite edge of the wing, strut means supported from a fixed support on the fuselage and extending therefrom to the outer wing section and connected to said section by a joint on an axis extending longitudinally of said wing and through said main joint, the outer wing section being rotatable about such longitudinal axis through the main joint to a substantially vertical position and being swingable about a vertical axis through said main joint to a side-wall position extending alongside the fuselage, said main joint being adjacent the forward edge of the wing and said wing rotation being in a direction to carry the rear edge of the outer wing section downward.

5. An aircraft as set forth in claim 4 in which said strut means extending from the fuselage outward and upward to an outer point on each outer wing section, said strut means including an articulated joint adjacent the vertical position of the downward-rotated wing section and supporting said wing during its swinging movement.

6. An aircraft, comprising a fuselage, a center wing section and two outer wing sections, each outer wing section being connected at its inner end to the aircraft by a main joint adjacent one edge of the wing and a releasable joint adjacent the opposite edge of the wing, strut means supported from a fixed support on the fuselage and extending therefrom to the outer wing section and connected to said section by a joint on an axis extending longitudinally of said wing and through said main joint, the outer wing section being rotatable about such longitudinal axis through the main joint to a substantially vertical position and being swingable about a vertical axis through said main joint to a side-wall position extending alongside the fuselage, said strut means extending from the fuselage outward and upward to an outer point on each outer wing section, said strut means including an articulated joint adjacent the vertical position of the downward-rotated wing section and supporting said wing during its swinging movement.

7. An aircraft having a fuselage and main lift wings, running gear therefor, comprising a pair of elongated bogies disposed in transversely spaced relation and extending substantial distances forward and rearward of the centers of lift and gravity of the aircraft, a main support yieldingly and pivotally connecting the aircraft to the bogies on transverse axes positioned rearward of the center of gravity of the aircraft, and a supplemental support connecting the aircraft to the bogies forward of the center of gravity thereof, said supplemental support including extensible means which, in ground operation of the craft, is collapsed by the weight of the craft to position the fuselage and bogies generally parallel with each other but which, during landing and take-off operation, extends to permit the front of the craft to be tilted substantially upward by the aerodynamic control elements of the craft to increase the angle of attack of the main lift wings for such landing and take-off while the bogies are positioned parallel to the ground for supporting the aircraft from the ground, and means to hold the extensible means collapsed during flight to position the bogies generally parallel with the fuselage in streamline relation with the craft.

8. An aircraft according to claim 7 with the addition of means to lock said supplemental support in its collapsed position.

9. An aircraft according to claim 7 with the addition that each bogie has a rear fixed-axis ground-engaging wheel and a front steerable ground-engaging wheel, and steering means in the aircraft connected for steering said front wheels.

10. An aircraft according to claim 9 in which the steering means includes a steering wheel rotatable in a fixed position, in combination with an aileron and elevator control wheel mounted coaxially with said steering wheel and movable both longitudinally of itself for elevator control and in rotation on its axis for aileron control.

11. An aircraft as set forth in claim 4, in which said strut means includes a main strut extending from a fixed articulation point adjacent the fuselage to a swingable articulation point adjacent the forward edge of the wing, and a collapsible strut extending from the main strut to an anchor point on the wing section rearward of the said longitudinal wing-rotation axis, and means to lock the collapsible strut in extended position.

12. An aircraft as set forth in claim 6 in which the articulated joint of the strut means is positioned adjacent the plane of the outer face of the wing section when said section is in side-wall position, and the strut means in such position of the wing extends along such outer face, and stop means inward of the wing and spaced from the said wing-rotation axis, the wing in such position being confined between the strut means and the stop means.

13. A two-engine aircraft, comprising
wing and fuselage structure forming a pilot cabin and a central wing section with the wing section extending outward from and above the main body of the cabin and with the cabin substantially below and extending forward of the wing section,
a forward engine mounted at the front of the fuselage structure within the frontal area of the cabin, having a cowling faired into the body of the cabin, and having a forwardly-extending propeller shaft carrying a front propeller,
said engine, cowling, cabin, and central wing section forming a substantially streamlined assembly terminating adjacent the rear of the center wing section, and having the front propeller at the nose thereof.
a rear engine mounted in said streamlined assembly and driving a rearwardly-extending propeller shaft carrying a rear propeller at the rear of said streamlined assembly,
a pair of booms fixed to the central wing section outwardly of said cabin and extending rearward in spaced relation with respect to each other and the area swept by said rear propeller,
outer wing sections connected to the central wing section and extending outward of the booms,
and a tail stabilizer and fin assembly carried by the booms in spaced relation behind said streamlined assembly and rear propeller,
and running gear for supporting the aircraft at a rear position rearward of the center of gravity of the aircraft and a front position forwardly thereof, an outer wing section connected to each side of said center wing section by a main swivel joint adjacent the forward edge of the wing and a releasable joint adjacent the rear edge of the wing, a fixed strut support at each side of the cabin below the swivel joint at that side of the center wing section, a strut extending from each fixed support outward to a swivel joint at an outer anchor point on the overlying outer wing section, said swivel joints defining a longitudinal wing-rotation axis about which the outer wing is rotatable to a substantially vertical position while supported by said main swivel joint and said strut, said outer wing sections being swingable in vertical position to rearwardly extending positions along the booms and at opposite sides of the rear propeller.

References Cited in the file of this patent

UNITED STATES PATENTS

| | | |
|---|---|---|
| 1,395,254 | Black | Nov. 1, 1921 |
| 1,481,400 | Weinberg | Jan. 22, 1924 |
| 1,901,734 | Cotroumpas | Mar. 14, 1933 |
| 2,196,828 | Hess | Apr. 9, 1940 |
| 2,429,975 | Avery | Nov. 4, 1947 |
| 2,562,490 | Hall | July 31, 1951 |
| 2,609,167 | Gero | Sept. 2, 1952 |
| 2,666,602 | Holland | Jan. 19, 1954 |
| 2,713,465 | Novinger | July 19, 1955 |